UNITED STATES PATENT OFFICE.

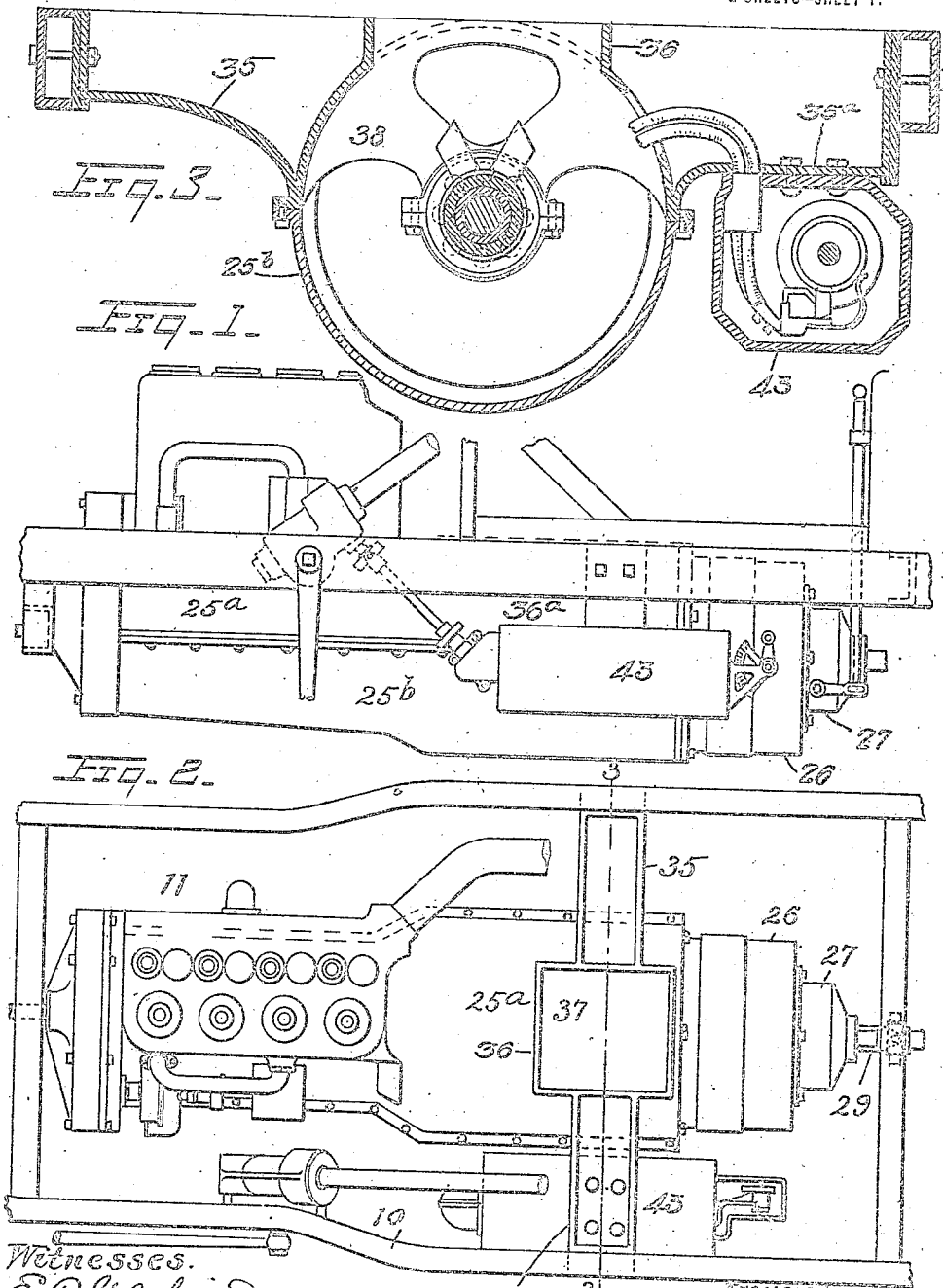

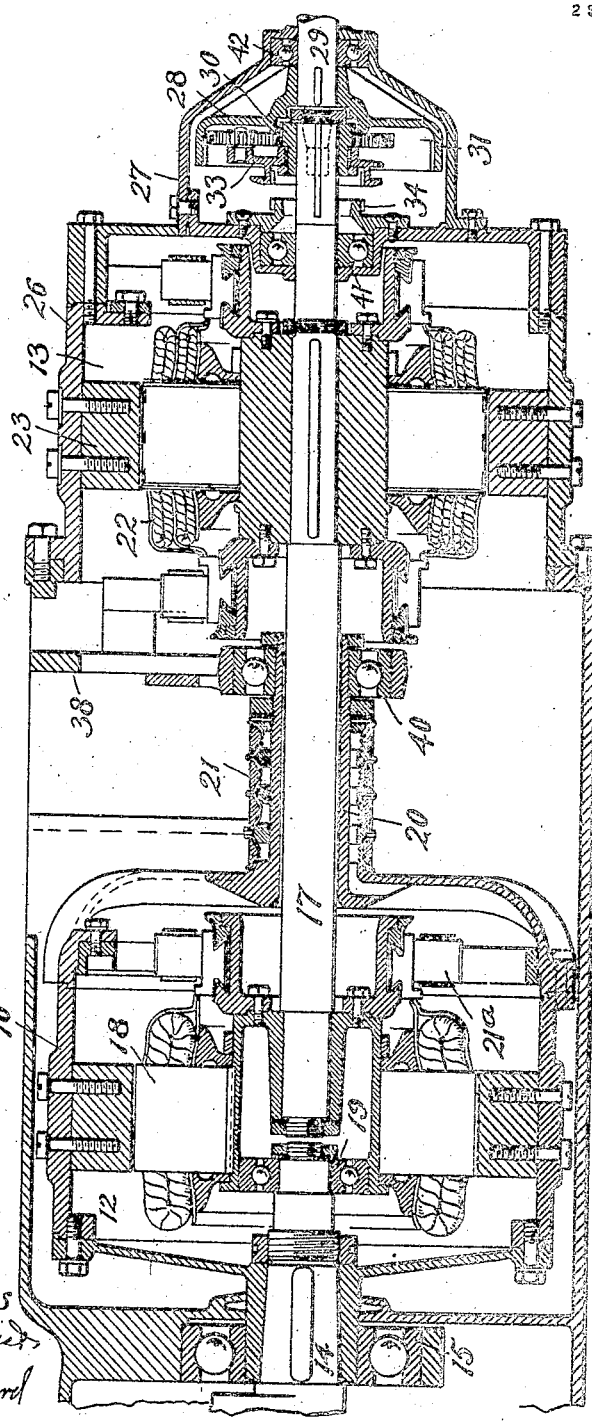

JUSTUS B. ENTZ, OF CLEVELAND, OHIO.

MOTOR-VEHICLE.

1,272,930.   Specification of Letters Patent.   Patented July 16, 1918.

Application filed April 3, 1913. Serial No. 758,521.

*To all whom it may concern:*

Be it known that I, JUSTUS B. ENTZ, a citizen of the United States, residing at Cleveland, in the county of Cuyahoga and State of Ohio, have invented a certain new and useful Improvement in Motor-Vehicles, of which the following is a full, clear, and exact description.

This invention relates to motor vehicles and particularly to driving or propelling mechanism of the type including the so-called electric transmission between the engine and the running gear, such as disclosed in my prior Patent No. 732,062, for power transmission and control, granted June 30, 1903, and as disclosed in my prior pending application for self-propelled vehicles, filed February 24, 1908, Serial No. 417,309. The present invention relates particularly to features of mechanical construction involving the inclosing casings for the engine and electric units, the bearings for the shafts, the support for the controller and other features.

The main object of the present invention is to provide a construction wherein are embodied the features of compactness, simplicity, durability and ease of assemblage and alinement.

The above and other objects are accomplished by my present invention which may be here briefly summarized as consisting in certain novel details of construction and combination and arrangement of parts, which will be described in the specification and set forth in the appended claims.

In the drawings wherein I have shown the preferred embodiment of my invention, Figure 1 is a side elevation of the vehicle propelling mechanism mounted upon the chassis, only the forward portion of which is shown, parts being broken away and the parts not essential to an understanding of my invention being omitted. Fig. 2 is a top plan view of the same. Fig. 3 is a transverse sectional view substantially along the line 3—3 of Fig. 2 looking in the direction indicated by the arrow, and the parts being shown on a slightly enlarged scale; and Fig. 4 is a vertical longitudinal sectional view on an enlarged scale showing particularly the electrical units of the transmission and the inclosing and supporting parts therefor.

Upon the chassis 10 of the vehicle, is supported the prime mover and transmission mechanism which includes a gas engine 11, a generator 12, both the armature and field elements of which are rotatable, and a motor 13 adapted to be supplied with current from the generator. The rear end of the crank shaft 14 of the engine is supported by a ball-and-ring bearing 15 from the casing hereinafter referred to, and is secured to the field member 16 of the generator 12, this field member being made sufficiently heavy to serve as the fly wheel of the engine. In alinement with the crank-shaft 14 is a driving shaft 17, the forward end of which is adjacent the rear end of the crank shaft and has secured to it the armature 18 of the generator. The forward end of the shaft 17, or rather the armature 18 has a bearing upon the rear end of the crank shaft 14 through the medium of a ball-and-ring bearing 19. The frame of the generator field 16 has at the rear of the armature a tubular or sleeve-like extension 20, through which the shaft 17 loosely extends, and upon which are mounted a plurality of collector rings 21 adapted to be engaged by brushes not shown, and the rings being adapted to be electrically connected to the field coils and to the brushes for the armature, the last named brushes being shown conventionally at 21ª, and being adapted to be supported from the frame of the generator field member.

At the rear of the collector rings 21, the shaft 17 has secured to it the armature member 22 of the motor 13, which armature coöperates with a suitable motor field member 23, the latter being fixed or stationary relative to the armature 22.

It will be noted by reference to Figs. 1, 2 and 4 that the engine and generator 16 of the electric transmission are inclosed within a single continuous casing 25 composed of an upper part 25ª and a lower removable part 25ᵇ, the two parts of this casing having along their longitudinal edges and in line with the axis of shafts 14 and 17, outwardly extending flanges, which are bolted together, as shown.

At the rear end of the casing 25 is a motor housing 26 which is bolted to the end of the casing 25, and secured to the rear end of the motor casing 26, is a casing 27 containing a reversing gear 28. The shaft 17 terminates in the casing 27, and the reversing gear 28 is adapted to serve as a clutch to cause a third shaft 29 which has its forward end adjacent the rear end of the shaft 17 to be driven in the same direction as the shaft 17 is driven for vehicle movement in a forward direction, and to cause said shaft 29 to be driven in a reverse direction with respect to the shaft 17 for reverse or backward drive. The shaft 29 will be connected to the rear axle in the usual manner.

The reversing gear (the details of which form no part of the present invention), includes a gear 30 splined to the shaft 17, an internal gear 31 keyed to the shaft 29 and one or more planetary gears 32 carried by a spider 33 and arranged to engage the teeth of the gear 30 and of the outer internal gear 31. When the parts are in the position shown in Fig. 4, the gear 30 and casting supporting the internal gear 31 are clutched together and the shafts 17 and 29 are driven at the same speed and in the same direction, but when the gear 30 and spider 33 carrying the planetary gears are moved forwardly, the spider is held from rotary movement by being clutched to the part 33 supported on the motor housing, and the rotary movement of the gear 30 is then transmitted to the internal gear and shaft 29 through the planetary gears 32, causing the shaft 29 to rotate in a reverse direction with respect to the shaft 17 which is at all times driven in the same direction.

By reference particularly to Figs. 2 and 3, it will be seen that the engine and electric units constituting the prime mover and electric transmission are supported from the chassis by a three-point suspension, the front part of the engine being supported from the front part of the chassis at a single central point, and the rear part of the engine and generator casing 25 being supported from the sides of the chassis by two arms 35 and 35ª, which as will be seen are integral with the upper part of the casing 25. These arms are of hollow formation, and are united with the body of the upper portion of the casing near its rear end as shown. Between these arms where they unite with the casing, an upwardly extending rectangular flange 36 constitutes the body of a manhole 37 which may be closed with a suitable cover.

Extending across the rear part of the portion 25ª of the casing 25, is an integral web or partition plate 38, see particularly Figs. 3 and 4, and in the center of this web 38 is supported a ring-and-ball bearing 40 forming a bearing for the rear end of the field frame or of the tubular extension 20 of the field frame, this bearing being located between the generator 12 and motor 13. A ring-and-ball bearing 41 is provided for the rear end of shaft 17, this bearing being supported from the rear end of the motor housing 26. The forward bearing 42 for the shaft 29 is supported from the rear end of the housing 27 of the reversing gear.

It will be seen therefore that the rotary field member has both its front and rear bearings carried by the same integral support,—namely, the engine casing and its integral extension. Consequently, the bearings for this member can be properly alined with the engine bearings, and it will run true at all times.

As shown particularly in Figs. 2 and 3, the controller, the housing of which is shown at 43, is carried by the arm 35ª extending between one side of the chassis frame and the rear part of casing 25.

By thus supporting the controller, not only is it so situated as to be in proper relationship with respect to the controller operating member which is operated by the steering post, a portion of which is shown at 44, but I am enabled to carry the conductors 45 from the electric units into the controller housing without exposing the conductors or of carrying them to the exterior of the inclosed parts. The conductors are preferably carried from the casing 25, through an opening in the cylindrical wall thereof into and through the hollow arm 35ª, the upper part of which can be closed by a suitable cover plate, thence downwardly into the controller casing.

Having thus described my invention, what I claim is:

1. In a propelling mechanism for a motor vehicle, an engine including a crank shaft, a shaft alined with the crank shaft, a generator having rotary field and armature elements, one secured to the crank shaft and the other secured to said alined shaft, a driving motor adapted to receive current from the generator, the engine having an integral extension provided with a bearing for the said element of the generator which is secured to the crank shaft, said bearing being located between the generator and motor.

2. In a propelling mechanism for a motor vehicle, an engine including a crank shaft, a shaft alined with the crank shaft, a generator at the rear of the engine having rotary field and armature elements, one connected to the crank shaft, and the other connected to said alined shaft, a driving motor adapted to receive current from the generator, said engine having a casing provided with an integral extension inclosing the generator, said extension having a bearing for the rear end of said rotary element of the generator which is connected to the crank shaft.

3. In a propelling mechanism for a motor vehicle, an engine including a crank shaft, a shaft alined with the crank shaft, a generator at the rear of the engine, a motor at the rear of the generator and adapted to receive current from the generator, said generator having rotary field and armature elements, one connected to the crank shaft and the other connected to said alined shaft, the motor having a stationary housing and a rotary armature, said engine having a casing provided with a rearward extension inclosing the generator, said casing supporting the crank shaft, the forward end of said alined shaft, the rear end of said generator element which is connected to the crank shaft, and the said motor housing being secured to said casing and having a bearing for the rear end of said alined shaft.

4. In combination in a motor vehicle, a prime mover comprising a gas engine, a generator having field and armature elements, one connected to the engine shaft, a motor adapted to receive current from said generator, a supporting frame for the engine, generator and motor, a support for the front end of said frame, hollow laterally projecting arms constituting supports for the rear end of the frame, an electric controller carried by one of said arms, and conductors extending from the controller into and through the arm and through the wall of said inclosure.

5. In a propelling mechanism for a motor vehicle, an engine having a crank shaft, a shaft alined therewith, a generator having rotary field and armature elements, one connected to the crank shaft and the other to the alined shaft, the generator being at the rear of the engine, bearings for the rear end of the crank shaft, for the forward end of the alined shaft, and for the rear end of the element of the generator which is connected to the crank shaft, said bearings being supported in integral extensions of the engine frame.

In testimony whereof I hereunto affix my signature in the presence of two witnesses.

JUSTUS B. ENTZ.

Witnesses:
 A. J. HUDSON,
 N. C. HUBBARD.